Aug. 1, 1967  F. CRUCIANI  3,333,713
TRAVERSING CABLE SUPPORTED HOIST
Filed April 27, 1964  2 Sheets-Sheet 1
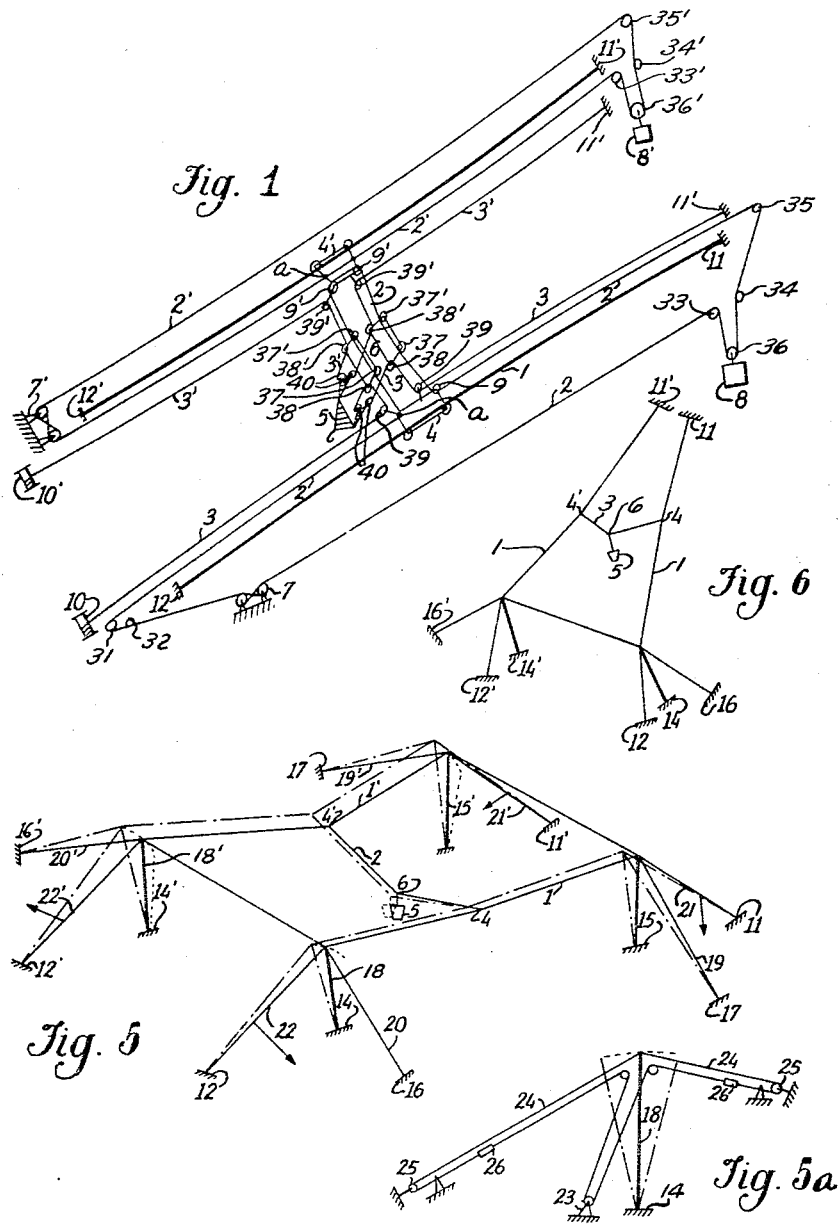
INVENTOR
FRIDO CRUCIANI
BY Mason, Fenwick & Lawrence
ATTORNEYS

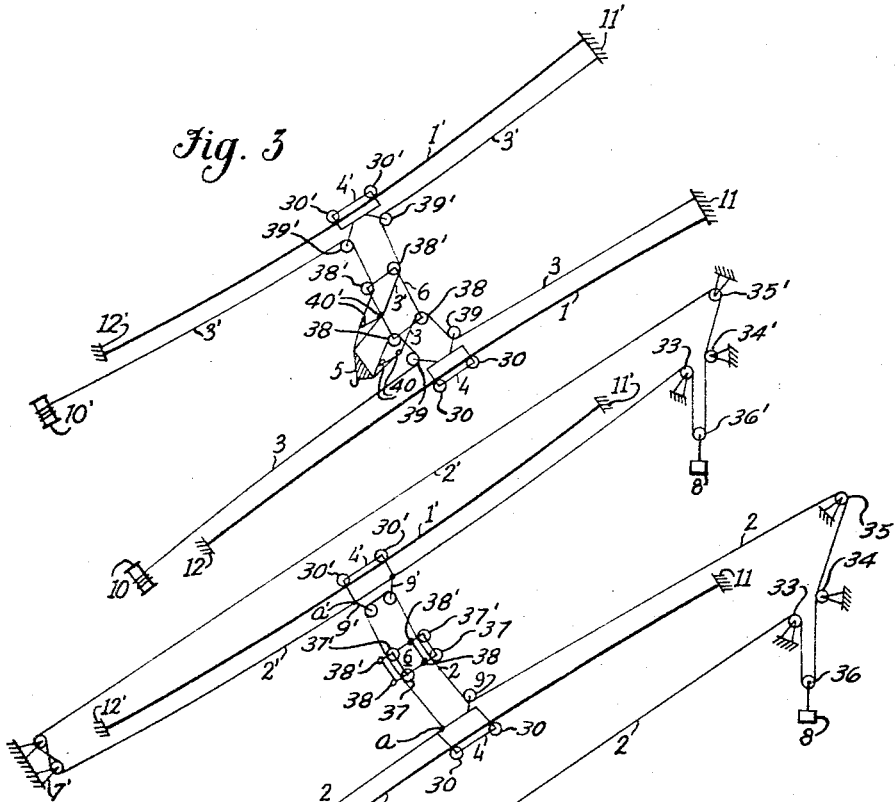
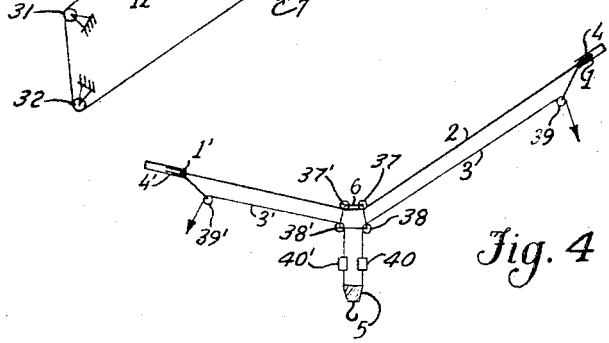

United States Patent Office 3,333,713
Patented Aug. 1, 1967

3,333,713
TRAVERSING CABLE SUPPORTED HOIST
Frido Cruciani, Rome, Italy, assignor to Centine e
Blondins Cruciani S.p.A., Rome, Italy
Filed Apr. 27, 1964, Ser. No. 363,017
Claims priority, application Italy, May 4, 1963,
85/223
3 Claims. (Cl. 212—76)

The present invention relates to an aerial transporting system and more specifically to an aerial transporting system which may be utilized for carrying loads aloft and depositing them in selected locations between a pair of spaced elevated objects.

An object of this invention is to provide an aerial transporting system having simple and easy operable means which are adapted to be employed between elevated areas spaced at distances even greater than one hundred meters.

Another object of the present invention is to provide an aerial transporting system adapted to carry loads onto selected locations in the immediate proximity of vertical construction, without the necessity of employing heavy and rigid transverse members for supporting carrying cables, and which requires a minimum number of carrying cables.

A further object of this invention is to provide an aerial transporting system including transverse cables for carrying loads between two main carrying cables, wherein the transverse cable is formed as part of a cable for hauling a main trolley on one of the main carrying cables.

Other objects and advantages of the present invention will become more apparent to those persons skilled in the art from the following description, taken in conjunction with the accompanying drawings, wherein:

FIGURE 1 is a diagrammatical representation of an embodiment of the invention;

FIGURE 2 is a diagrammatical representation of the hauling cables of the embodiment illustrated in FIGURE 1;

FIGURE 3 is a diagrammatical representation of the control cables of the embodiment illustrated in FIGURE 1;

FIGURE 4 is an enlarged, transverse vertical cross-sectional view of the embodiment;

FIGURE 5 is a perspective view of a modification of the embodiment;

FIGURE 5a is a diagrammatical representation of another modification of the invention; and FIGURE 6 is a diagrammatical representation of a further modification of the embodiment.

Briefly described, the present invention relates to an aerial transporting system generally comprising first and second main carrying cables having the ends thereof anchored on spaced elevated objects, first and second trolleys movably mounted on the carrying cables, first and second hauling cables for moving the main trolleys along their respective carrying cables, one of the hauling cables having sections thereof extending transversely between the first and second main trolleys, a transverse trolley movably mounted on the transverse sections of the transverse hauling cable sections, a hook element disposed below the transverse trolley, and a pair of winch operated control cables spanning the elevated objects operatively connected to the main trolleys, the transverse trolley and the hook element whereby upon operation of the hauling cables, the main trolleys will be displaced between the elevated objects, upon operation of the control cable winches in opposite directions, the transverse trolley will be displaced transversely between the main trolleys and upon operation of the control cable winches in the same direction, vertical displacement of the hook element will be effected.

FIGURES 1 through 3 illustrate an aerial transporting system including spaced main carrying cables 1, 1', the ends of which are anchored to spaced elevated objects 11, 11' and 12, 12' such as mountains and the like. FIGURE 1 represents a superimposition of FIGURES 2 and 3.

The main carrying cables 1, 1' carry main trolleys 4, 4', having pairs of pulleys 30, 30' running on main cables 1, 1'. Secured to the trolleys 4, 4' are cables 2, 2', respectively, for displacing the trolleys on the main cables. The displacing cables 2, 2' form a closed loop and their arrangements are dissimilar. As best shown in FIGURE 2, cable 2 is anchored at a point $a$ to the trolley 4, passes around stationary guide pulleys 31, 32 mounted on one of the elevated objects, is operatively connected to a winch 7, extends to and is reeved around pulleys 33, 34, 35 and 36 on the opposite elevated object, extends to and around a pulley 9 of the trolley 4, extends to and around a pulley pair 9', 9' of the trolley 4' and extends back to the anchoring point $a$ of the trolley 4.

Cable 2' is anchored at a point $a'$ on the trolley 4', extends to and is operatively connected to a second winch 7' mounted on one of the elevated objects, extends to and is reeved around pulleys 35', 34', 33' and 36' on the opposite elevated object, and extends back to the anchoring point $a'$ of the trolley 4'. Between the pulley pairs 33, 34, and 33' and 34' conventional tensioning counterweights 8, 8' are arranged on the cables 2, 2' by means of pulleys 36 and 36'.

In the arrangement described, the trolleys 4, 4' will be caused to be displaced along the cables 1, 1' by simultaneously actuating the winches 7, 7'. On the sections of cables 2, 2' between the trolleys 4, 4' a secondary trolley 6 is movable on pulleys 37 and 37' transversely to the running direction of the trolleys 4, 4'. The transverse movement of the trolley 6 is controlled by cables 3, 3', which also control the hoisting and lowering movement of a hook element 5, as illustrated in FIGURE 1. For controlling the transverse movement of the transverse trolley 6 and the vertical movement of the hook element 5, one set of ends of cables 3, 3' is anchored to the elevated objects 11, 11'. The other set of ends of the cables 3, 3' are operatively connected to winches 10, 10', respectively. As best illustrated in FIGURE 3, the cables 3, 3' extend from anchoring points 11, 11' and pass around a first set of pulleys 39, 39' on trolleys 4, 4', a first set of pulleys 38, 38' on trolley 6, sets of pulleys 40, 40' on hook element 5, a second set of pulleys 38, 38' on trolley 6 and a second set of pulleys 39, 39' of the trolleys 4, 4'. It will be appreciated that by operating the winches 10, 10' in the opposite directions, transverse displacement of the trolley 6 along the transverse sections of cable 2 will be effected, whereas, by operating the winches 10, 10' in the same direction, a hoisting or lowering of the hook element 5 will be effected. In view of the fact that the transverse movement of the trolley 6 is provided by means of the action of the control cable winches, there is no need in maintaining the carrying cables 1, 1' at the same horizontal level.

By running the winches 7 and 7' there is obtained the traveling of the trolleys (and thence of the load 5), parallel to the carrying cables 1 and 1', as previously described in connection with FIGURE 2. By running the winches 10 and 10' there is obtained the displacement of the trolley 6 (and thence of the load 5) in the direction normal to the carrying cables, and the hoisting or lowering of the load 5. From the above it follows that the installation can serve the zone included between the two cables 1 and 1' leaving, of course side edges.

Referring to FIGURE 5, when the terrain is not provided with elevated areas for anchoring the carrying cable, it is necessary to set up derricks 14 and 15 for hoisting the cables 1 and 1'. These derricks 14 and 15 rest on the ground by means of a hinge and are supported at the top by the carrying cables 1 and 1' and the bracing cables 19 and 20.

In order to relieve the bracing cables 19 and 20, additional cables 21 and 22 can be set up, which are fastened on the carrying cables 2 in the proximity of the anchorages 11 and 12. The cables 21 and 22 are placed under tension so as to deflect the carrying cables, whereby each cable 21 and 22 will pull outwards the carrying cable 1, with a force proportional to the pull thereof, and since when the load 5 is (for example) close to the carrying cable 1, the latter is tauter than the 1', and therefore the possibility is seen of tilting the derricks outwards for extending the zone served by the installation. In such a case, the bracing cables 19 and 20 are to be elastically set up, for example, by applying a weight thereto.

When, during the riggings the change in length of the cable 2, is small, the cable 2 can be fastened to the trolleys 4 and the change of sag can be taken up by the swinging of the derricks. This will be facilitated by the fact that as the trolleys 4 are running, for example toward the derricks, the approaching force of the cable will be exerted on the bracing cable 19 in a greater extent than on the bracing cables 20.

According to circumstances, it can be useful to fasten the hoisting cables 3 to the block of the pulling cable 8; this relieves the stresses of no-load riggings.

In order to improve the swings of the derricks, a winch 23 having an endless cable, as illustrated in FIGURE 5a, can be set up, which, by means of a cable 24, re-run by the pulleys 25 and fastened at the top of the derrick 14, is capable of making the derrick 14 to tilt according to the direction of rotation of the winch 23.

The stops 26 are provided for safety purposes to make sure against any occurrence. For small transversal zones to be served, the "Blondin" apparatus can be also set up with only one carrying cable, by tilting the derrick.

Referring to FIGURE 6, when the terrain is provided with a high side and it is advantageous to serve a larger zone in the low portion, the installation can be provided with the carrying cables 1 not parallel.

In this case, in order to relieve the draw winch of the trolleys 4, it is expedient that the anchoring points 11 are higher than the tops of the derricks 14.

I claim:
1. An aerial transporting system comprising a first main carrying cable, a second main carrying cable spaced from said first main carrying cable, the ends of said main carrying cables being anchored on spaced elevated objects, a first main trolley movably mounted on said first main carrying cable, a second main trolley movably mounted on said second main carrying cable, first and second hauling cables, said first hauling cable being close looped and winch driven having one end thereof anchored on said first main trolley and extending and being reeved around a stationary pulley mounted on one of said elevated objects, extending between said elevated objects and reeved around at least one stationary pulley mounted on the other of said elevated objects, extending to and reeved around a first pulley on said first main trolley, extending to and reeved around at least a first pulley mounted on said second main trolley and extending to and being anchored at its opposite end on said first main trolley, providing a pair of spaced transverse cable sections extending between said first and second main trolleys, said second hauling cable being close looped and winch driven having one end secured to said second main trolley and extending to and reeved around stationary pulleys mounted on one of said elevated objects, extending to and reeved around at least one stationary pulley mounted on the other of said elevated objects and extending to and secured to said second main trolley, a transverse trolley movably mounted on said transverse cable sections interconnecting said first and second main trolleys, a hook element disposed below said transverse trolley, a first control cable having one end anchored on one of said elevated objects and extending to and reeved around a second pulley mounted on said first main trolley, extending to and reeved around a first pulley mounted on said transverse trolley, extending to and reeved around at least one pulley mounted on said hook element, extending to and reeved around a second pulley mounted on said transverse trolley, extending to and around a third pulley mounted on said first main trolley and extending to and being operatively connected to a winch mechanism mounted on the other of said elevated objects, a second control cable having one end thereof anchored on one of said elevated objects and extending to and reeved around a second pulley mounted on said second main trolley, extending to and reeved around a third pulley mounted on said transverse trolley, extending to and reeved around at least one pulley mounted on said hook element, extending to and reeved around a fourth pulley mounted on said transverse trolley, extending to and reeved around a third pulley mounted on said second main trolley and extending to and being operatively connected to a winch mechanism mounted on the other of said elevated objects, whereby upon operation of said first and second hauling cable winches said main trolleys will be displaced between said elevated objects, upon operation of said control cable winches in opposite directions said transverse trolley will be displaced transversely relative to said main carrying cables and upon operation of said control cable winches in the same direction vertical displacement of said hook element will be effected.

2. An aerial transporting system according to claim 1, wherein one set of ends of said first and second main carrying cables is adapted to be anchored to one of said spaced objects, two derricks are provided for anchoring the other ends of said main carrying cables on the upper ends thereof, the lower ends of said derricks being hinged on the ground, a cross cable interconnects the upper ends of said derricks, first and second bracing cables are provided for each of said derricks, each having one end anchored to the upper end of one of said derricks and the other end to the ground, the first ground anchoring points of said two first bracing cables lying in a plane passing through said cross cable and the second anchoring points of said second bracing cables lying in planes passing through said main cables, and a weight is provided on each of said second bracing cables to compensate for the change of the length of the operatively connected main carrying cable.

3. An aerial transporting system according to claim 1, wherein both ends of said first and second main cables are anchored to the upper ends of four derricks.

References Cited

UNITED STATES PATENTS

| | | | |
|---|---|---|---|
| 700,321 | 5/1902 | French | 212—19 |
| 1,502,997 | 7/1924 | Marrian et al. | 212—24 |
| 1,729,964 | 10/1929 | Peugh | 212—19 |
| 2,035,107 | 3/1936 | Voss | 212—87 |
| 2,055,673 | 9/1936 | Smilie | 212—19 |

FOREIGN PATENTS 682,243    11/1952    Great Britain.

ARTHUR L. LA POINT, *Primary Examiner.*

MILTON BUCHLER, *Examiner.*

F. W. MONAGHAN, H. BELTRAN,
*Assistant Examiners.*